United States Patent [19]
Kachich

[11] Patent Number: 5,591,070
[45] Date of Patent: Jan. 7, 1997

[54] AIR TOOL WITH EXHAUST DIVERTING VALVE

[75] Inventor: Albert J. Kachich, Katy, Tex.

[73] Assignee: Indresco Inc., Dallas, Tex.

[21] Appl. No.: 287,544

[22] Filed: Aug. 8, 1994

[51] Int. Cl.⁶ .................. B23B 45/04; B24B 23/02
[52] U.S. Cl. .............. 451/295; 451/358; 451/359; 173/219; 173/221; 173/169
[58] Field of Search ................... 173/218, 219, 173/221, 168, 169; 451/294, 295, 344, 358, 359

[56] References Cited

U.S. PATENT DOCUMENTS

| | | | |
|---|---|---|---|
| 3,116,617 | 1/1964 | Skoog | 64/26 |
| 3,299,781 | 1/1967 | Law | 173/169 |
| 3,373,824 | 3/1968 | Whitehouse | 173/12 |
| 3,472,081 | 10/1969 | Keller et al. | 74/48 |
| 3,556,230 | 1/1971 | Rogenburk | 172/93.5 |
| 3,586,115 | 6/1971 | Arntsberg | 173/163 |
| 3,610,343 | 10/1971 | Bratt | 173/12 |
| 3,696,871 | 10/1972 | Stenbacka | 173/12 |
| 3,739,659 | 6/1973 | Workman, Jr. | 74/751 |
| 3,809,179 | 5/1974 | Delaney, Jr. et al. | 181/36 A |
| 3,871,138 | 3/1975 | Welsch | |
| 3,940,818 | 3/1976 | Anderson | 451/449 |
| 4,081,038 | 3/1978 | Andersson et al. | 173/162 |
| 4,120,604 | 10/1978 | Garofalo | 415/25 |
| 4,147,219 | 4/1979 | Wallace | 173/12 |
| 4,155,278 | 5/1979 | Estok | 81/57.11 |
| 4,266,444 | 5/1981 | Anderson et al. | 74/661 |
| 4,300,641 | 11/1981 | Kinkel | 173/12 |
| 4,307,784 | 12/1981 | Smith | 173/12 |
| 4,359,107 | 11/1982 | Smith | 173/12 |
| 4,380,270 | 4/1983 | Ludwig | 451/359 |
| 4,434,858 | 3/1984 | Whitehouse | 173/12 |
| 4,462,282 | 7/1984 | Biek | 81/57.11 |
| 4,484,871 | 11/1984 | Adman et al. | 418/69 |
| 4,522,269 | 11/1985 | Adman et al. | 173/12 |
| 4,553,948 | 11/1985 | Tatsuno | 464/25 |
| 4,766,787 | 8/1988 | Sugimoto et al. | 81/463 |
| 4,789,373 | 12/1988 | Adman | 464/25 |
| 4,836,296 | 6/1989 | Biek | 173/93.5 |
| 4,844,177 | 7/1989 | Robinson et al. | 173/12 |
| 4,869,139 | 9/1989 | Gotman | 81/475 |
| 4,880,064 | 11/1989 | Willoughby et al. | 173/12 |
| 4,962,787 | 10/1990 | Mayhew | 173/170 |
| 4,991,473 | 2/1991 | Gotman | 81/475 |
| 5,080,181 | 1/1992 | Tatsuno | 173/93.5 |
| 5,092,410 | 3/1992 | Wallace et al. | 173/93.5 |
| 5,170,532 | 12/1992 | Holmin et al. | 451/358 |
| 5,181,575 | 1/1993 | Maruyama et al. | 173/180 |
| 5,203,242 | 4/1993 | Hansson | 81/469 |
| 5,273,120 | 12/1993 | Chang | 173/162.2 |

OTHER PUBLICATIONS

*Atlas Copco* Catalog, four pages.
"Cleco Air Tools" *Industrial Tool Division, Indresco,* Copyright 1993, covers and pp. G-8 and G-9.
"Introducing a Revolutionary Series of Grinders." *Ingersoll-Rand Professional Tools,* two pages.
*Atlas Copco* 1987 Catalog, "Industrial Power Tools" (five pages).

*Primary Examiner*—Timothy V. Eley
*Attorney, Agent, or Firm*—Baker & Botts, L.L.P.

[57] ABSTRACT

A pneumatic tool (10) is described for diverting exhaust air from an air motor (18) between a rearward opening (22), a forward opening (24), or both, without requiring any disassembly. An exhaust diverting valve selector (26) allows adjustment of the direction of flow as determined by an exhaust diverting valve (60) from the exterior of tool (10). A method of manufacturing a pneumatic tool (10) with an exhaust diverting valve (60) is also disclosed.

10 Claims, 2 Drawing Sheets

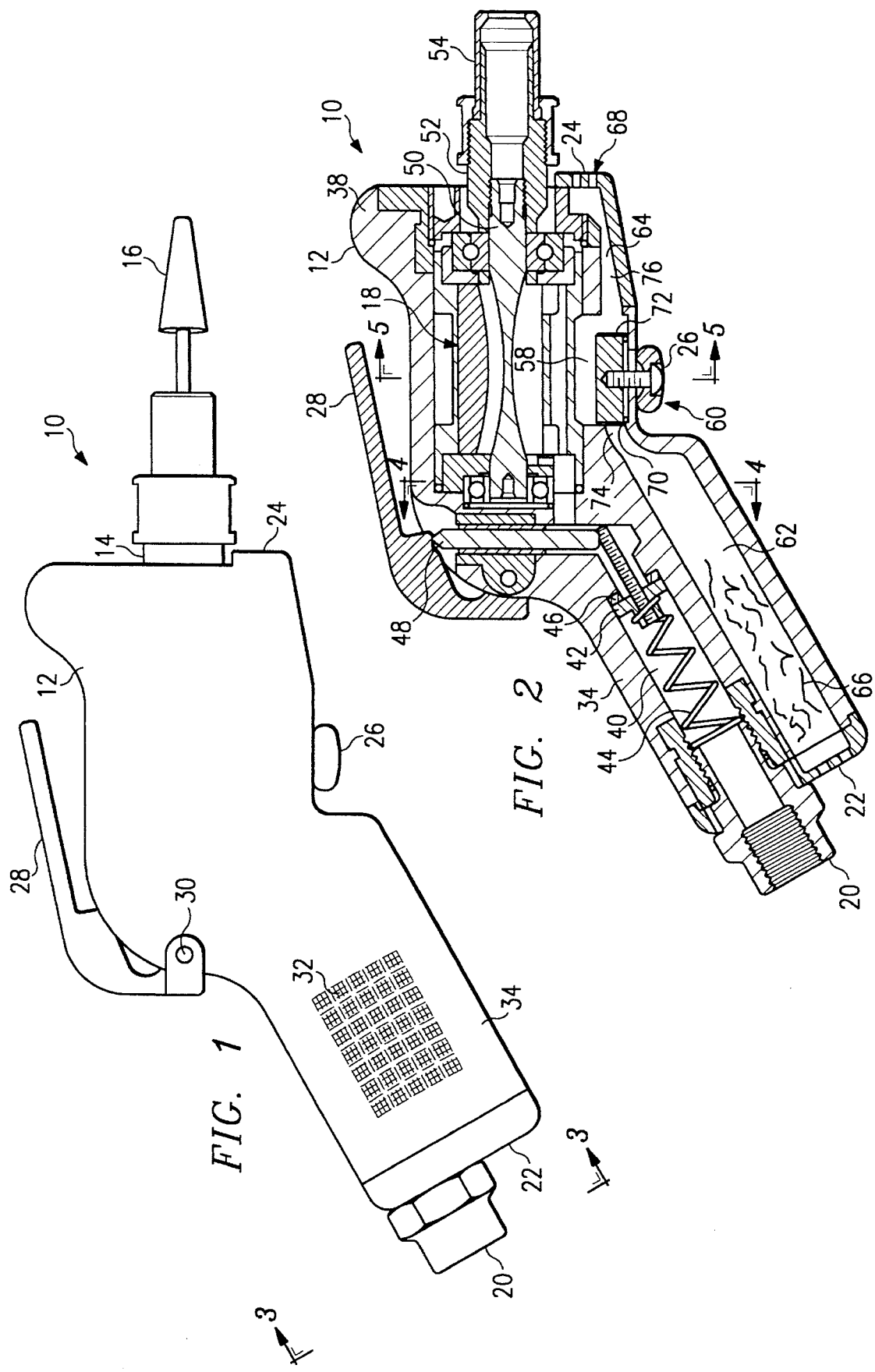

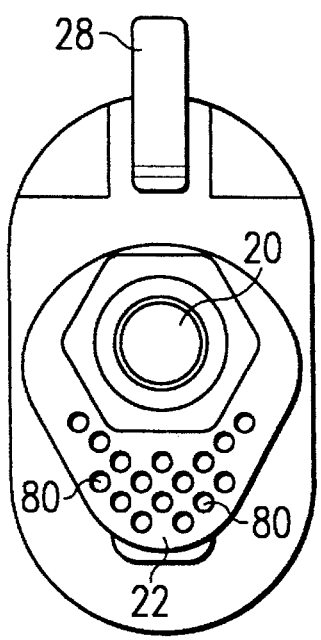
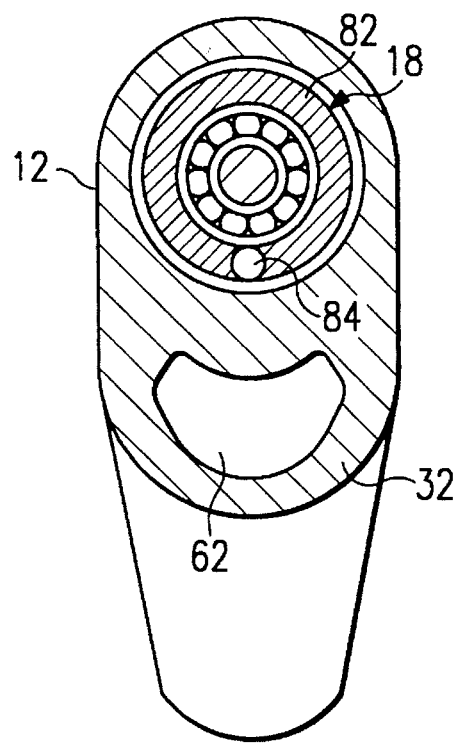
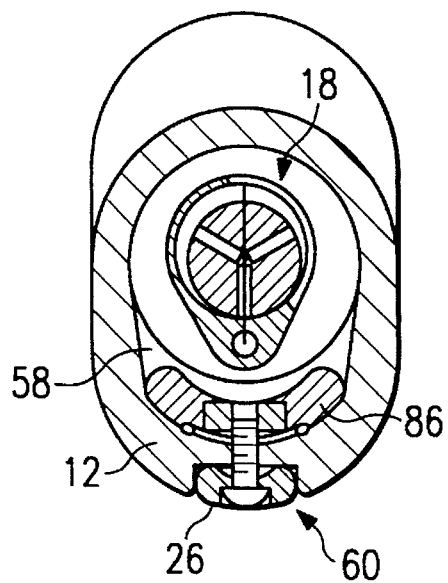

5,591,070

AIR TOOL WITH EXHAUST DIVERTING VALVE

TECHNICAL FIELD OF THE INVENTION

This invention relates to air tools, and more particularly to an air tool with an exhaust diverting valve.

RELATED APPLICATION

This application is related to co-pending, co-assigned U.S. patent application Ser. No. 08/287.543, filed Aug. 08, 1994, and entitled "Ergonomic Power Tool," which is incorporated herein for all purposes.

BACKGROUND OF THE INVENTION

Pneumatic, or air-powered, tools are used in a number of applications. One pneumatic tool is known as a die grinder and is frequently used to remove excess material, such as a weld bead. Pneumatic tools create exhaust air during use that is usually channeled or exhausted in a particular direction. The direction desired may vary according to the task at hand. Typically, a pneumatic tool has a fixed direction for the exhaust. There are, however, a couple air-powered tools containing an adjustable exhaust allowing both forward and rearward exhaust, but these tools require at least partial disassembly in order to reverse directions. An example of this latter type of tool is Ingersoll-Rand Model No. CD350RG4L.

SUMMARY OF THE INVENTION

A need has arisen for an air-powered tool allowing convenient and easy manipulation of the direction of the exhaust air flow without requiring any disassembly. In accordance with the present invention, an air tool with an exhaust diverting valve is provided that substantially eliminates or reduces disadvantages and problems associated with previously developed air tools.

According to an aspect of the present invention, a pneumatic power tool is provided having a housing with a cavity, supply air chamber, rearward exhaust chamber, and a forward exhaust chamber. A motor with a drive assembly is disposed within the cavity of the housing. A tool element may be releasably secured to the drive assembly to perform a particular task with the tool element while it rotates under the influence of the motor. A throttle valve may be coupled to the motor for controlling the speed of the motor. An exhaust diverting valve is provided within the housing for diverting the exhaust air developed by the air motor between the rearward exhaust chamber, the forward exhaust chamber, or both. An exhaust valve selector is coupled to the exhaust-diverting valve for allowing manipulation of the diverting valve without requiring any disassembly.

Technical advantages of the present invention include that the exhaust air flow may be easily controlled between a rearward position, a forward position, or between both in varying amounts. It is further a technical advantage of the present invention, that the exhaust air may be manipulated between the above-mentioned positions without requiring disassembly to adjust the exhaust flow.

BRIEF DESCRIPTION OF THE DRAWINGS

For a more complete understanding of the present invention, and the advantages thereof, reference is now made to the following description taken in conjunction with the accompanying drawings, in which:

FIG. 1 is an elevational view of the air-powered tool according to the present invention;

FIG. 2 is a sectional view of an air-powered tool according to an aspect of the present invention;

FIG. 3 is a view taken along line 3—3 of FIG. 1;

FIG. 4 is a cross-sectional view of the air tool taken along line 4—4 of FIG. 2; and FIG. 5 is a cross-sectional view of the air tool taken along line 5—5 of FIG. 2.

DETAILED DESCRIPTION OF THE INVENTION

The preferred embodiments of the present invention and its advantages are best understood by referring to FIGS. 1 through 5 of the drawings, like numerals being used for like and corresponding parts of the various drawings.

The present invention has application to any air-powered, or pneumatic, tool in which it may be desirable to control the exhaust air between a rearward or forward position or both. The present invention is, however, shown in the context of a pneumatic die grinder for illustrative purposes.

Referring now to FIG. 1, die grinder 10 is shown with a housing 12. A drive assembly 14 extends from a portion of housing 12. Drive assembly 14 releasably couples to a tool element 16, such as a grinding element, which may be used to process a piece of metal of other material. Housing 12 contains a motor 18 (FIG. 2) that rotates drive assembly 14 and tool element 16. Motor 18 is preferably an air motor, but other fluids could be used.

Air motor 18 is powered by a pressurized air source delivered through air inlet 20. Exhaust air developed by air motor 18 during use may be exhausted to a rearward exhaust 22 or a forward exhaust 24, or both, according to the position of an exhaust-diverting valve selector 26. The speed of motor 18 may be controlled by a throttle lever 28, which is pivoted about pivot 30. Housing 12 may include a flexible, vibration-absorbing material that forms housing 12 or a flexible, vibration-absorbing material 32 that is attached to a handle portion 34 of housing 12. Flexible, vibration-absorbing material 32 may be, for example, a polymer material.

Referring now to FIG. 2, there is shown a sectional view of die grinder 10 of FIG. 1 with tool element 16 removed. Die grinder 10 has housing 12 formed with a main body portion 38 and a handle portion 34. Formed on handle portion 34 may be air inlet 20, which may have a threaded connection to secure the pressurized air source or supply. Coupled to air inlet 20 and in fluid communication therewith, is an air supply chamber 40, which is formed in handle 34. A throttle valve or tilt valve 42 is located to one end of air supply chamber 40. A spring 44 biases throttle valve 42 against a valve seat 46. Throttle valve 42 is coupled through linkage 48 to throttle lever 28. Depressing throttle lever 28 causes throttle valve 42 to become unseated from seat 46 and thereby allows air past throttle valve 42 which is then delivered to air motor 18. The speed of rotation of motor 18 may be controlled by throttle lever 28.

When supplied with pressurized air, air motor 18 rotates under the influence of the pressurized air. Rotation of motor 18 causes rotor 50, which is part of drive assembly 14, to rotate. Rotor 50 is coupled to chuck 52, which has collets 54. Chuck 52 is operable to receive and releasably secure a tool element, such as element 16. When in use, air motor 18 produces an exhaust air which is delivered to a receiving chamber 58. The flow out of receiving chamber 58 is determined by the position of an exhaust diverting valve 60. Exhaust diverting valve 60 may be moved under the influence of exhaust diverting valve selector 26 from the exterior of tool 10 without requiring any disassembly. Air exiting receiving chamber 58 can proceed to a rearward exhaust chamber 62 or a forward exhaust chamber 64, or both, depending on selector 26. Rearward exhaust chamber 62 is coupled to rearward air exhaust 22. Rearward exhaust chamber 62 may contain a muffling material 66 or other mechanism for muffling noise of the exhaust such as shown in U. S. Pat. No. 3,809,179, to Delaney, Jr., et al , which is incorporated herein for all purposes. Forward exhaust chamber 64 is coupled to forward air exhaust 24, which may be comprised of a plurality of exhaust holes 68.

Exhaust diverting valve 60 may take numerous shapes and sizes, but enables the operator to manipulate the flow of exhaust air such that all of the air exhausts through rearward exhaust 22 or forward exhaust 24, or may be positioned so that the exhaust flows with a desired percentage flow to each of exhausts 22, 24. Exhaust diverting valve 60 shown in FIG. 2 has a first edge wall 70 and a second edge wall 72. First edge wall 70 is shown sealing off an entrance 74 to rearward exhaust chamber 62. Thus, when exhaust air for motor 18 enters receiving chamber 58, it is directed to flow into forward exhaust chamber 64 and out forward exhaust 24. By sliding exhaust diverting valves selector 26 towards forward exhaust 24, second edge wall 72 is caused to close forward exhaust chamber opening 76, and thus, directs the exhaust air through rearward exhaust opening 74, into rearward exhaust chamber 62, and out rearward exhaust 22. By placing exhaust diverting valve selector 26 between openings 74 and 76, the exhaust air from motor 18 will be diverted towards rearward exhaust 22 and forward exhaust 24; the percentage flow into each opening 22, 24, may be controlled according to the position of selector 26. Additionally, the orientation of walls 74, 76 can be adjusted to allow increased control of the flow to both openings 22, 24, e.g., similar to a proportional valve.

Referring now to FIG. 3, it can be seen that rearward air exhaust 22 may be formed by a plurality of exhaust openings 80. Of coursed other shapes and configurations could be used.

Referring now to FIG. 4, the formation of rearward exhaust chamber 62 in handle 32 may be seen. A portion of air motor 18 is shown in cavity 82 of housing 12. Bearing 84 is shown in the cross-section as well. Other details of air motor 18 need not be described in detail as they are known in the art.

FIG. 5 shows a cross-sectional view taken through exhaust diverting valve 60. Selector 26 extends through an opening 101 in housing 12, and is coupled to an extended portion 86 within receiving chamber 58. Opening 101 is sealed by portions 86. Air from motor 18 is delivered to receiving chamber 58 and directed according to the position of valve 60, which may be positioned without requiring any disassembly.

In operation, the operator may place air tool 10 in the palm of their hand such that their thumb may rest on throttle lever 28 and their fingers around handle portion 34. The operator may place a finger on exhaust diverting valve 26 and slide selector 26 to adjust the direction in which the exhaust air is directed. The operator depresses throttle lever 28 to cause air motor 18 to run, which in turn produces exhaust air. If the operator desires to blow debris away from the front of tool 10 or for some other reason desires a forward air exhaust, selector 26 is moved to the most rearward position (edge wall 70 closes opening 74). If it is desired to have the air exhaust to the rear, selector 26 is moved to its forward most position (edge wall 72 closes opening 76). If it is desired to have both a rearward and forward flow of air from tool 10, selector 26 is placed in a middle or intermediate position. Selector 26 may be moved between positions to adjust the amount of flow from openings 22 and 24.

Although the present invention and its advantages have been described in detail, it should be understood that various changes, substitutions and alterations can be made therein without departing from the spirit and scope of the invention as defined by the appended claims.

What is claimed is:

1. A pneumatic power tool comprising:

a housing having a cavity, a supply air chamber, a rearward exhaust chamber, and a forward exhaust chamber;

a drive assembly;

an air motor disposed in the cavity and coupled to the drive assembly for rotating the drive assembly, the air motor producing exhaust air when in operation;

a throttle valve for controlling the operation and speed of the air motor;

an exhaust diverting valve for controlling the flow of exhaust air between the rearward exhaust chamber and the forward exhaust chamber;

an exhaust diverting valve selector having an exterior portion positioned on the exterior surface of the tool for adjusting the exhaust diverting valve;

wherein the housing further comprises a receiving chamber for receiving exhaust air from the air motor; and wherein the exhaust diverting valve comprises:
an extended portion having a first end wall and a second end wall;
a first opening proximate the first end of the receiving chamber, the first opening in fluid communication with the rearward exhaust chamber;
a second opening proximate a second end of the receiving chamber, the second opening in fluid communication with the forward exhaust chamber; and
wherein the extended portion is disposed within and slidable within an opening formed in the housing and in the receiving chamber between a first position where the first edge wall seals the first opening and a second position where the second edge wall seals the second opening.

2. The pneumatic power tool of claim 1 wherein the housing comprises a main portion and a handle portion.

3. The pneumatic power tool of claim 2 wherein the housing is formed of a flexible, vibration-absorbing material.

4. The pneumatic power tool of claim 2 further comprising a flexible, vibration-absorbing material attached to the handle portion.

5. The pneumatic power tool of claim 1 further comprising a chuck coupled to the drive assembly.

6. An air-powered industrial tool having an exterior surface, the tool comprising:

a housing having a main body portion formed with a cavity therein and having a handle portion;

a drive assembly;

a chuck secured to the drive assembly for receiving a tool element on a first end of the drive assembly;

an air motor disposed in the cavity of the main body portion and coupled to the drive assembly for rotating the drive assembly, the motor producing exhaust air when in operation;

a throttle valve for controlling the speed and operation of the air motor;

the handle portion having an air supply chamber and a rearward exhaust chamber formed therein;

the cavity formed to have a forward exhaust chamber therein and a receiving chamber for receiving the exhaust air from the air motor, the receiving chamber coupled to the rearward exhaust chamber and the frontward exhaust chamber;

an exhaust diverting valve between the rearward exhaust chamber and the forward exhaust chamber for controlling the flow of exhaust air between the forward exhaust chamber and rearward exhaust chamber in any proportion;

an exhaust diverting valve selector positioned on the exterior surface of the tool for adjusting the exhaust diverting vane; and wherein the exhaust diverting valve comprises:
  an extended portion having a first end wall and a second end wall;
  a first opening proximate the first end of the receiving chamber, the first opening in fluid communication with the rearward exhaust chamber;
  a second opening proximate a second end of the receiving chamber, the second opening in fluid communication with the forward exhaust chamber; and
  wherein the extended portions are slidable within an opening formed in the housing and in the receiving chamber between a first position where the first edge wall seals the first opening and a second position where the second edge wall seals the second opening.

7. The air-powered industrial tool of claim 6, further comprising a flexible, vibration-absorbing material attached to the handle portion.

8. The air-powered industrial tool of claim 6, wherein tile housing is formed of flexible, vibration-absorbing material.

9. The air-powered industrial tool of claim 8, wherein the flexible, vibration-absorbing material is a plastic material.

10. The air-powered industrial tool of claim 6, further comprising a muffler material disposed in the rearward exhaust chamber.

* * * * *